United States Patent Office 3,019,814
Patented Feb. 6, 1962

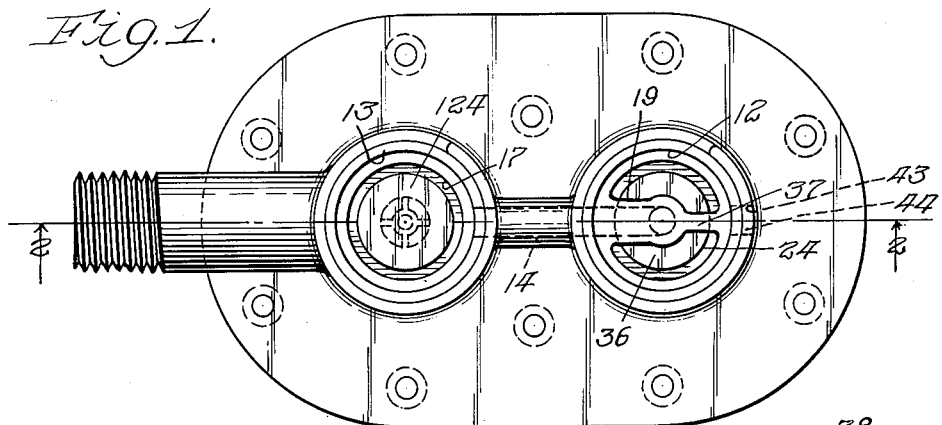
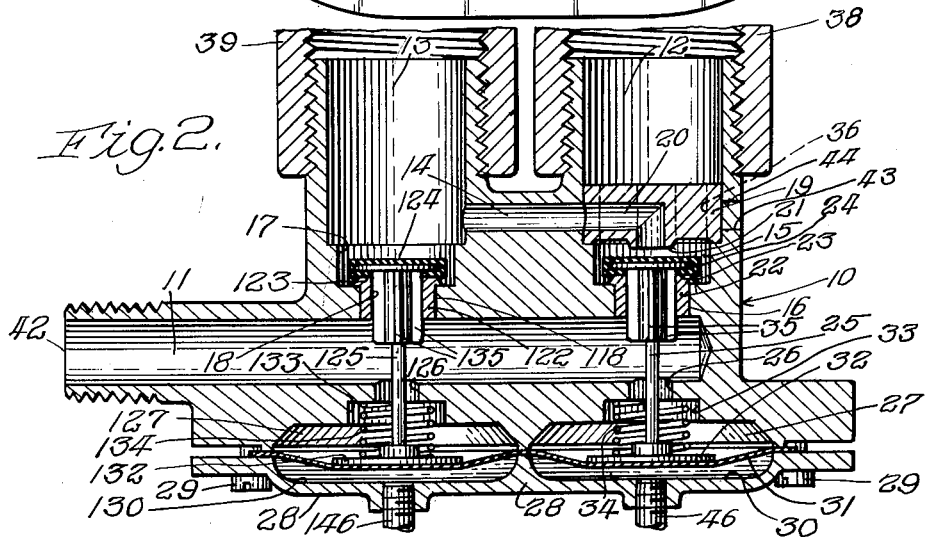
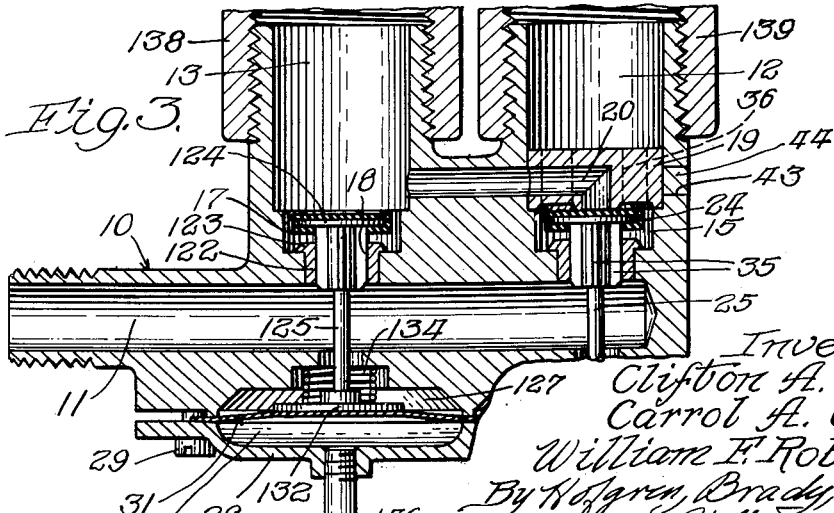

3,019,814
HOME APPLIANCE
Clifton A. Cobb, Carrol A. Orr, and William F. Robandt, Jr., all of St. Joseph, Mich., assignors to Whirlpool Corporation, a corporation of Delaware
Filed Nov. 2, 1959, Ser. No. 850,396
3 Claims. (Cl. 137—607)

This invention relates to a mixing valve.

In many structures it is necessary to supply fluid such as water at any one of a number of temperatures. This is particularly true on laundry equipment where the temperature of the water supplied to the equipment will depend upon the particular washing operation in the laundry cycle or upon the type of material being laundered.

The mixing valve structure of this invention is capable of supplying hot water, medium temperature water or medium cold water as desired. Alternatively, by reversing the hot and cold inlet water lines, the mixing valve structure may be utilized to provide either cold water, medium temperature water or medium hot water.

One of the features of this invention is to provide an improved mixing valve structure comprising means forming a mixing chamber having an outlet therefrom, means forming first and second fluid inlet passages into said chamber, valve means in said first inlet passage for opening and closing the first inlet passage, means forming a relatively restricted flow by-pass passage interconnecting said inlet passages, means opening said by-pass passage for restricted flow upon closing said valve and closing said by-pass passage upon opening said valve.

Another feature of the invention is to provide an improved mixing valve structure comprising means forming a mixing chamber having an outlet therefrom, means forming first and second fluid inlet passages into said chamber, means forming a relatively restricted flow by-pass passage interconnecting said inlet passages, means forming a first valve seat in said first inlet passage, means forming a second valve seat in said by-pass passage, valve means in said first inlet passage movable between said valve seats, the valve means closing said first inlet passage into the mixing chamber and opening the by-pass passage when in engagement with the first valve seat and opening the first inlet passage and closing the by-pass passage when in engagement with the second valve seat, means for selectively moving the valve means into engagement with the valve seats, and a valve means in said second fluid inlet passage for selectively opening or closing said second fluid inlet passage.

A further feature of the invention is to provide an improved mixing valve structure comprising means forming a mixing chamber having an outlet therefrom, means forming a first fluid inlet passage into said chamber, means forming a second fluid inlet passage into said chamber, means forming a relatively restricted flow by-pass passage interconnecting said inlet passages, valve means in said first fluid inlet passage for opening and closing said first inlet passage, and means operatively associated with said valve means for opening said by-pass passage when said valve means is in inlet passage closing position.

Another feature of the invention is to provide an improved mixing valve structure comprising means forming a mixing chamber having an outlet therefrom, means forming a first fluid inlet passage into said chamber, means forming a second fluid inlet passage into said chamber, means forming a relatively restricted flow by-pass passage interconnecting said inlet passages, a first valve seat member in said first inlet passage having a passage communicating with said by-pass passage and a first valve seat, a second valve seat member mountable in the first inlet passage having a passage communicating with said mixing chamber and a second valve seat, valve means in said first inlet passage movable between said valve seats, the valve means closing said first inlet passage into the mixing chamber and opening the by-pass passage when in engagement with the first valve seat and opening the first inlet passage and closing the by-pass passage when in engagement with the second valve seat, means for selectively moving the valve means into engagement with the valve seats, a third valve seat member in said second inlet passage downstream of said by-pass passage having a passage communicating with said mixing chamber and a third valve seat, second valve means in said second inlet passage movable to and from said third valve seat, said second valve means closing said second inlet passage into the mixing chamber when in engagement with said third valve seat, and means for moving said second valve means to and from engagement with said third valve seat.

Other features and advantages of the invention will be apparent from the following description of certain embodiments thereof taken in conjunction with the accompanying drawings. Of the drawings:

FIGURE 1 is a plan view of a mixing valve structure embodying the invention.

FIGURE 2 is a sectional elevational view taken substantially along line 2—2 of FIGURE 1 and adding thereto certain adjacent portions of the water flow system shown diagrammatically.

FIGURE 3 is a sectional elevational view similar to FIGURE 2 but showing an alternative arrangement of the structure.

The mixing valve structure shown in the accompanying drawings comprises a valve body 10 formed with a mixing chamber 11 therein in the shape of an elongated manifold and a pair of fluid inlet passage means 12 and 13 leading into the mixing chamber 11. The inlet passage 12 in the valve arrangement of FIGURES 1 and 2 is a hot water passage and inlet passage 13 is a cold water passage. In the valve arrangement of FIGURE 3, inlet passage 12 is a cold water passage and inlet passage 13 is a hot water passage. Interconnecting the passages 12 and 13 in the valve body 10 is a transverse by-pass passage 14 having a relatively small cross sectional area for restricted flow. The end of the passage means 12 adjacent the mixing chamber 11 is provided with successively reduced diameter sections 15 and 16 of cylindrical shape and substantially coaxial with the inlet passage 12.

Inlet passage means 13 is of substantially the same diameter as that of passage 12 and is provided with successively reduced diameter sections 17 and 18, section 17 being similar in size and position to section 15 and section 18 similar in size and location to section 16.

A first valve seat member 19 is located at the bottom of passage 12 just above first reduced section 15. This first valve seat member is provided with a passage 20 similar in size to and joining with by-pass passage 14. Passage 20 has a central section extending toward the mixing chamber 11 and the valve seat member 19 is provided with a first valve seat 21 extending into the reduced section 15.

Located in the reduced section 16 of inlet passage 12 is a second valve seat member 22 which may be formed integrally with body 10 or comprise a separate member as shown. The second valve seat member 22 is generally annular in shape and is provided with a second valve seat 23. The valve seats 21 and 23 are in spaced, confronting relationship to each other within the passage section 15.

Movably mounted in passage section 15 is a valve means 24 in the form of a flat circular disk mounted on a stem 25 that extends down through valve seat member 22, through mixing chamber 11, through an opening 26 on the side of valve body 10 opposite to the passage 12, and into a chamber 27. Chamber 27 is formed by a recess in the body 10 and by a cooperating plate 28 attached to the side of the valve body 10 that is opposite to the passages 12 and 13 as by a plurality of screws 29. Plate 28 is provided with a first cup-shaped portion 30 which cooperates with a similar cup-shaped portion on the valve body 10 to form the chamber 27.

Extending across chamber 27 is a flexible vertically movable diaphragm 31 peripherally held between the valve body 10 and the plate 28 by the bolts 29. The end of the stem 25 opposite the valve disk 24 is attached to a plate 32. Between plate 32 and the inner end of a recess 33 at one end of the opening 26 is a helical compression spring 34 that normally urges the plate 32, diaphragm 31 and stem 25 away from passage 12 to hold valve disk 24 against the second valve seat 23, as illustrated in FIGURE 2. To guide the movement of the stem 25, and thus of the parts associated therewith, the end of the stem adjacent valve disk 24 is provided with three outwardly extending vanes 35 spaced approximately 120° apart. These vanes have their outer edges adapted to contact the inner cylindrical surface of the valve seat member 22 to guide the valve in its movement.

To operate valve 24 and the associated parts there is provided a pipe 46 for fluid, i.e. gas or liquid, under pressure leading into the chamber 27 on the side of the diaphragm 31 opposite to the valve body 10.

Flow of water from inlet passage 13 to mixing chamber 11 is controlled by flow control means generally similar to the flow control means in passage 12 as described above, except that no valve seat member similar to valve seat member 19 is provided. To facilitate understanding thereof, elements of the flow control means in inlet passage 13 similar to corresponding elements of the flow control means in inlet passage 12 are identified by similar reference numerals but one hundred higher. More specifically, the flow control means in inlet passage 13 includes a valve means 124 in the form of a flat circular disk mounted on a stem 125 extending downwardly through an annular valve seat member 122 which may be formed integrally with body 10 or comprise a separate member as shown. Valve seat member 122 is generally annular in shape and is provided with a valve seat 123 in reduced diameter portion 17 of inlet passage means 13. Valve stem 125 continues downwardly through mixing chamber 11, through an opening 126 on the side of valve body 10 opposite to the passage 13, and into a chamber 127. Chamber 127 is formed by a recess in the body 10 and by a cup-shaped portion 130 in plate 28. Diaphragm 31 continues from chamber 27 to extend across chamber 127 and is urged downwardly in chamber 127 by a helical compression spring 134 acting between a plate 132 abutting the diaphragm and the valve body 10 in a recess 133 opening into chamber 127. Vanes 135 of stem 125 guide the valve in its movement. A pipe 146 communicates with chamber 127 on the side of diaphragm 31 opposite to valve body 10 and is arranged to provide fluid under pressure to the chamber for operating the valve 124.

As illustrated most clearly in FIGURE 1, valve seat member 19 is provided with flow passages 36 on opposite sides of the passage 20 and on opposite sides of a reinforcing web 37 diametrically aligned with passage 20. Body 10 may be formed by molding and to form passage 14 in body 10, the mold includes a portion extending through the outer wall, forming a hole 43 therein which is preferably closed subsequently by a plug 44.

As illustrated in FIGURE 2, the valve is arranged with a hot water inlet line 38 of usual construction connected to passage means 12 and a cold water inlet line 39 also of usual construction connected to passage means 13.

The operation of the valve as illustrated in FIGURES 1 and 2 is as follows. To effect delivery of hot water, valve 124 is maintained seated on valve seat 123 while valve 24 is opened by supplying fluid under pressure through pipe 46 into chamber 27 which raises diaphragm 31 and plate 32 against the resistance of spring 34 to press valve 24 tightly against valve seat 21. This blocks by-pass passage 14 and opens the passage through member 22 so that hot water flows through inlet passage 12, through flow passage 36 into section 15, through the passage in valve seat member 22 into the chamber 11, and outwardly from chamber 11 through an exit line 42 shown diagrammatically in FIGURE 2.

When water having a medium temperature is required, valve 24 and associated parts are returned to the positions described above in conjunction with the hot water provision and valve 124 is unseated from member 123. Thus, cold water flows from inlet passage 13 directly into mixing chamber 11 and hot water flows concurrently from passage 12 at a comparable volume rate of flow directly into the mixing chamber 11.

When medium cold water (cooler than medium) is required, fluid is shut off from pipe 46 so that spring 34 moves valve 24 and associated parts into the position shown in FIGURE 2 wherein valve 24 engages valve seat 23. Valve 124 is opened by supplying fluid under pressure through pipe 146 into chamber 127 to raise the portion of diaphragm 31 therein and plate 132 against the resistance of spring 134, thereby spacing valve 124 upwardly from the valve seat 123. This opens the passage through annular member 122 permitting cold water to flow from inlet passage 13, through reduced diameter passage portion 17, through the passage in valve seat member 122 into the mixing chamber 11, and outwardly from mixing chamber 11 through the exit line 42. At the same time, hot water flows from passage 12 in a restricted stream through passages 36, 20 and 14 into the cold water inlet passage 12 to mix with the cold water therein and flow with the cold water into the mixing chamber 11 to pass to exit line 42 as medium cold water.

In the arrangement of the valve shown in FIGURE 3, the valve body 10 and the parts thereof are exactly the same as that of the embodiment of FIGURES 1 and 2. In this arrangement, however, hot water inlet line 138 is connected to inlet passage means 13 and cold water inlet line 139 is connected to inlet passage means 12. In this arrangement, the valve may be operated to provide selectively cold water, medium temperature water, or medium hot water.

In the arrangement of FIGURE 3, the valve operates as follows: When cold water is desired, valve 124 is maintained closed while valve 24 is unseated from seat 23 by admitting fluid under pressure through pipe 46 to chamber 27, thereby to permit the cold water to flow from inlet passage 13, through the side passages 36, through section 17 and valve seat meber 22, into the chamber 11 and to exit line 42.

When medium temperature water is desired, fluid pressure is fed into each of pipes 46 and 146 to raise the two portions of diaphragm 31 to the position shown in FIGURE 3 so that valve 124 unseats from seat 123, and valve 24 unseats from seat 23 and seats on valve seat 21 to block passage 20. Cold water then flows through cold water inlet 12 and through side passages 36 into the section 15. From section 15, the cold water flows through valve seat meber 22 into chamber 11 to join the hot water flowing thereinto from hot water inlet passage 13.

When medium hot water is desired, fluid pressure is released in supply pipe 46 so that the spring 34 urges the valve member 24 downwardly to seat on valve seat 23, and fluid under pressure is admitted to chamber 127 through supply pipe 146 to move valve 124 to open position and permit the water in the hot water inlet passage 13 to flow directly through passage sections 17 and member 122 into chamber 11. Cold water flows through side passages 36 in section 12 and through by-pass passages 20 and 14 to mingle with the hot water in the hot water inlet passage 13 and to pass with the hot water as medium hot water into the mixing chamber 11.

Thus, the valve seat member 19 is disposed in the hot water inlet passage means when the water temperatures required are hot, medium and medium cold. When the water temperatures required are cold, medium and medium hot the member 19 is disposed in the cold water inlet passage means. In all other respects, the two arrangements of the valve are similar.

Having described our invention as related to the embodiments shown in the accompanying drawings, it is our intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. A mixing valve structure comprising: means forming a mixing chamber having an outlet therefrom; means forming a first inlet passage for delivering a first fluid into said chamber; means forming a second inlet passage for delivering a second fluid into said chamber, including a portion for receiving the second fluid prior to the delivery thereof to said mixing chamber; means forming a relatively restricted flow by-pass passage from said first inlet passage into said portion of the second inlet passage for delivery of first fluid to said portion; means forming a first valve seat in said first inlet passage; means forming a second valve seat in said by-pass passage; valve means in said first inlet passage movable between said valve seats, said valve means closing said first inlet passage into said mixing chamber and opening said by-pass passage when in engagement with said first valve seat and opening said first inlet passage and closing said by-pass passage when in engagement with said second valve seat; and means for moving said valve means into selective engagement with said valve seats.

2. A mixing valve structure comprising: means forming a mixing chamber having an outlet therefrom; means forming a first inlet passage for delivering a first fluid into said chamber; means forming a second inlet passage for delivering a second fluid into said chamber, including a portion for receiving the second fluid prior to the delivery thereof to said mixing chamber; means forming a relatively restricted flow by-pass passage from said first inlet passage into said portion of the second inlet passage for delivery of first fluid to said portion; means forming a first valve seat in said first inlet passage; means forming a second valve seat in said by-pass passage; valve means in said first inlet passage movable between said valve seats, said valve means closing said first inlet passage into said mixing chamber and opening said by-pass passage when in engagement with said first valve seat and opening said first inlet passage and closing said by-pass passage when in engagement with said second valve seat; means for moving said valve means into selective engagement with said valve seats; and a valve for opening and closing said second inlet passage downstream of said portion.

3. A mixing valve structure comprising: means forming a mixing chamber having an outlet therefrom; means forming a first inlet passage for delivering a first fluid into said chamber; means forming a second inlet passage for delivering a second fluid into said chamber; means forming a relatively restricted flow by-pass passage interconnecting said first inlet passage and said portion of the second inlet passage for delivery of first fluid to said portion; first valve means in one of said inlet passages for opening and closing said one inlet passage; means operatively associated with said valve means for opening said by-pass passage when said valve means is in inlet passage closing position; and second valve means in the other of said inlet passages downstream of said by-pass passage for opening and closing said other inlet passage.

References Cited in the file of this patent

UNITED STATES PATENTS

| | | |
|---|---|---|
| 1,108,550 | Chubb | Aug. 25, 1914 |
| 2,169,043 | Goehring | Aug. 8, 1939 |
| 2,698,029 | Branson | Dec. 28, 1954 |
| 2,748,799 | Rath | June 5, 1956 |